Patented Jan. 21, 1947

2,414,762

UNITED STATES PATENT OFFICE 2,414,762

PROCESS FOR THE PRODUCTION OF ACRYLONITRILE

John J. Owen and Charles N. Kimberlin, Jr., Baton Rouge, La., assignors, by mesne assignments, to Jasco, Incorporated, a corporation of Louisiana No Drawing. Application December 30, 1941, Serial No. 424,900

1 Claim. (Cl. 260—464)

The present invention relates to an improved method for the production of alkenoic nitriles from alkyne hydrocarbons, more particularly, the invention relates to an improved process for the conversion of acetylene to acrylonitrile.

It has heretofore been proposed as in German Patent 559,734 to produce acrylonitrile from acetylene by reacting hydrocyanic acid and acetylene in the presence of barium cyanide as a catalyst. It has been demonstrated, however, that this method of producing acrylonitrile gives yields of 10% or less. It is therefore apparent that improved methods giving yields better than 10% based upon the acetylene reacted would be very advantageous. Other known methods for the production of alkenoic nitriles include the addition of hydrogen cyanide to alkylene oxide to produce cyanhydrins which can be dehydrated to yield alkenoic nitriles; the reaction of alkali cyanides with alkylene chlorohydrins to give alkylene cyanhydrins which are then dehydrated or a series of reactions illustrated by the reactions leading to acrylonitrile in which hydrogen cyanide is added to acetaldehyde to produce lactonitrile which is then treated with acetic anhydride to form acetoxypropionitrile which is then converted to acrylonitrile by pyrolysis.

It has now been found that by passing anhydrous acetylene and anhydrous hydrocyanic acid gas over a heated alkali metal cyanide deposited upon an inert refractory carrier yields of from 17% to 23% and more of acrylonitrile based upon the acetylene charged can be secured. The temperature maintained within the reaction tube varies between the limits of 750° F. and 1250° F. but is preferably held between the limits of 850° F. and 1150° F. The anhydrous reactants are passed over the hot catalyst under atmospheric pressure at a rate of from 0.5 gram mol per hour to 2.0 gram mols per hour per 100 cc. of catalyst, i. e., the rate at which the individual reactants are fed to the reaction chamber is from 0.25 gram mol per hour to one gram mol per hour per 100 cc. of catalyst. The catalyst comprises an alkali metal cyanide, such as sodium or potassium cyanide deposited upon an inert refractory carrier, such as magnesia in granular or pellet form, silica gel, alumina, kieselguhr, etc. The anhydrous acetylene and the anhydrous hydrocyanic acid gas may also be reacted by passing them through a bath of molten mixed alkali metal cyanides, the mixture of alkali metal cyanides instead of a single alkali metal cyanide being used to secure a lower melting point bath. Unreacted materials may be recovered and recycled.

The catalyst can be deposited upon the carrier in either of two ways. An aqueous solution of alkali cyanide can be used to saturate the carrier which is in either a granular or pellet form. If the carrier is in granular form and pellets are desired, they may be molded from the granular material while still moist from having been saturated with an aqueous solution of the alkali cyanide. The saturated material, either in granular or pellet form, is then dried at 100° C. or above. The catalyst can also be formed by saturating the carrier with an aqueous solution of alkali hydroxides or carbonates and then thoroughly dried. When this dried material is used in the reaction zone the alkali hydroxides and carbonates are converted to the alkali cyanides by reaction with hydrogen cyanide.

The invention will be more completely understood from the following examples which are given for the purpose of illustrating the invention:

Example 1

10 grams of potassium cyanide were dissolved in a small amount of water and the solution was mixed with 100 cc. of magnesia pellets. After the solution was completely absorbed, the impregnated pellets were dried and placed in a silica tube which could be electrically heated. The tube was gradually heated and a mixture of 0.5 gram mol per hour of anhydrous acetylene and 0.5 gram mol per hour of anhydrous hydrogen cyanide was passed through. The acetylene gas was first scrubbed with water and then dried with calcium chloride before being passed over the heated catalyst. When a temperature of 850° F. had been reached, it was observed that the reaction had started. The feed was then continued for about an hour. The maximum temperature reached during the reaction was 1115° F. The product, after condensation, was found to contain 25% acrylonitrile based on the acetylene used in the reaction.

Example 2

The above experiment was repeated using porous alumina as the carrier for the potassium cyanide. In this case the reaction started at 940° F. and the maximum temperature during operation was 1180° F. The condensate contained 11% acrylonitrile based upon the acetylene used.

Example 3

In this run the same procedure was followed as in Example 1 except that kieselguhr pellets were used as the catalyst base. The reaction was observed to start at 850° F. and the maximum temperature reached was 1250° F. The yield of acrylonitrile was 17%.

Example 4

20 grams of potassium cyanide were dissolved in a small amount of water and the resulting solution used to impregnate 100 cc. of kieselguhr pellets. The pellets were then completely dried after which they were used as the catalyst in a reaction conducted under the conditions of Example 1. The reaction was again observed to commence at 850° F. and the maximum temperature observed was 1240° F. The yield of acrylonitrile was 18%.

Example 5

10 grams of potassium cyanide were deposited upon 100 cc. of kieselguhr pellets according to the method previously described and then used as the catalyst in a further reaction. In this reaction the feed rate of anhydrous acetylene was 0.5 gram mol per hour and that of the anhydrous hydrogen cyanide 2 gram mols per hour. The reaction commenced at 850° F. and the maximum temperature observed was 1150° F. A yield of 17% of acrylonitrile was obtained based upon the acetylene added during the reaction period.

Example 6

10 grams of sodium hydroxide were dissolved in a small amount of water and mixed with 100 cc. of kieselguhr pellets and the solution completely absorbed. The impregnated pellets were dried and placed in a silica reaction tube. The tube was gradually heated while anhydrous acetylene and anhydrous hydrogen cyanide were each added at a rate of 0.5 gram mol per hour. The product was first obtained at a temperature of 900° F. The reaction was allowed to continue for one hour, the maximum temperature reached being 1125° F. The yield of acrylonitrile was 18%.

Example 7

The procedure as outlined in Example 1 was repeated with silica gel used as the catalyst carrier in place of magnesia. The reaction was observed to start at 750° F. and the maximum temperature attained was 1050° F. The yield of acrylonitrile was 20%.

Example 8

The procedure outlined in Example 3 above was repeated with the exception that the acetylene gas was not dried after the water washing operation. The temperature of initial reaction was observed to be 900° F. and the maximum temperature reached during the reaction was 1130° F. A yield of less than 5% acrylonitrile was obtained.

Example 9

The procedure of Example 7 in which silica gel was used as the catalyst carrier was repeated with the exception that the acetylene feed was not dried before being introduced into the reaction zone. The reaction temperature was observed to be 900° F. with a maximum of 1100° F. A yield of less than 5% acrylonitrile based upon the acetylene charged was obtained.

What is claimed is:

A process for the production of acrylonitrile which consists in reacting anhydrous acetylene with anhydrous hydrocyanic acid gas at a temperature of from 850° F. to 1150° F. in the presence of potassium cyanide deposited on magnesium oxide, condensing the products of the reaction and recovering acrylonitrile.

JOHN J. OWEN.
CHARLES N. KIMBERLIN, Jr.